US010526436B2

(12) United States Patent
Wu et al.

(10) Patent No.: US 10,526,436 B2
(45) Date of Patent: Jan. 7, 2020

(54) POLYOLEFIN BLENDS INCLUDING CRYSTALLINE BLOCK COMPOSITES FOR PVC-FREE WEAR LAYERS

(71) Applicant: Dow Global Technologies LLC, Midland, MI (US)

(72) Inventors: Xiaosong Wu, Sugar Land, TX (US); Ronald J. Weeks, Lake Jackson, TX (US); Rennisha Wickham, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 16/089,923

(22) PCT Filed: Mar. 29, 2017

(86) PCT No.: PCT/US2017/024777
§ 371 (c)(1),
(2) Date: Sep. 28, 2018

(87) PCT Pub. No.: WO2017/172936
PCT Pub. Date: Oct. 5, 2017

(65) Prior Publication Data
US 2019/0112407 A1 Apr. 18, 2019

Related U.S. Application Data

(60) Provisional application No. 62/315,911, filed on Mar. 31, 2016.

(51) Int. Cl.
| C08F 295/00 | (2006.01) |
| C08F 297/08 | (2006.01) |
| C08L 23/26 | (2006.01) |
| C08F 210/02 | (2006.01) |
| C08F 210/06 | (2006.01) |
| C08F 210/16 | (2006.01) |
| C08K 5/00 | (2006.01) |
| C08L 23/08 | (2006.01) |
| C08L 23/14 | (2006.01) |
| C08L 53/00 | (2006.01) |

(52) U.S. Cl.
CPC ........ *C08F 297/083* (2013.01); *C08F 210/02* (2013.01); *C08F 210/06* (2013.01); *C08F 210/16* (2013.01); *C08F 295/00* (2013.01); *C08K 5/005* (2013.01); *C08L 23/0815* (2013.01); *C08L 23/142* (2013.01); *C08L 23/26* (2013.01); *C08L 53/00* (2013.01); *C08F 2500/07* (2013.01); *C08F 2500/08* (2013.01); *C08F 2500/12* (2013.01); *C08F 2800/20* (2013.01); *C08L 2205/035* (2013.01); *C08L 2207/02* (2013.01)

(58) Field of Classification Search
CPC ...... C08F 210/06; C08F 2/38; C08F 2500/12; C08L 23/142; C08L 23/0815
See application file for complete search history.

(56) References Cited

U.S. PATENT DOCUMENTS

| 4,965,319 | A | 10/1990 | Kawamoto |
| 5,391,612 | A | 2/1995 | Johnson |
| 5,721,314 | A * | 2/1998 | Hausmann ............. C08L 23/08 525/71 |
| 5,919,983 | A | 7/1999 | Rosen et al. |
| 6,207,761 | B1 | 3/2001 | Smith et al. |
| 6,344,525 | B1 | 2/2002 | Lee et al. |
| 6,403,721 | B1 * | 6/2002 | Ding ..................... C08L 23/10 525/191 |
| 7,355,089 | B2 | 4/2008 | Chang et al. |
| 7,951,882 | B2 | 5/2011 | Arriola et al. |
| 8,686,087 | B2 | 4/2014 | Li Pi Shan et al. |
| 9,303,156 | B2 | 4/2016 | Weeks et al. |
| 2006/0020086 | A1 * | 1/2006 | Smith ................ C08L 23/0807 525/240 |
| 2006/0199930 | A1 | 9/2006 | Li Pi Shan et al. |
| 2007/0167578 | A1 | 7/2007 | Arriola et al. |
| 2008/0267412 | A1 | 10/2008 | Oostveen |
| 2008/0311812 | A1 | 12/2008 | Arriola et al. |
| 2011/0313106 | A1 | 12/2011 | Shan et al. |
| 2011/0313107 | A1 | 12/2011 | Shan et al. |
| 2011/0313108 | A1 * | 12/2011 | Shan ..................... C08L 23/10 525/95 |
| 2012/0276348 | A1 | 11/2012 | Clausi et al. |

(Continued)

FOREIGN PATENT DOCUMENTS

| EP | 0382849 A1 | 8/1990 |
| KR | 100889620 B1 | 3/2009 |
| WO | 2013/034618 A1 | 3/2013 |

OTHER PUBLICATIONS

Modern Plastics Encyclopedia, 89, Mid-Oct. 1988 Issue, vol. 65, No. 11, pp. 86-92.

(Continued)

Primary Examiner — Mark S Kaucher
(74) Attorney, Agent, or Firm — Cheney Huang

(57) ABSTRACT

A composition comprising (A) from 10 wt % to 90 wt % of a polymeric ethylene ionomer; (B) from 10 wt % to 40 wt % of a propylene component including at least one propylene based polymer having a propylene content of at least 50.0 wt %, based on the total weight of the propylene based polymer, and a melt flow rate from 0.5 g/10 min to 200.0 g/10 min (according to ASTM D-1238 at 230° C./2.16 kg); and (C) from 5 wt % to 20 wt % of a crystalline block composite.

11 Claims, No Drawings

(56) References Cited

U.S. PATENT DOCUMENTS

2014/0138021 A1 5/2014 Schlisner
2015/0064434 A1 3/2015 Bastin et al.
2017/0355840 A1* 12/2017 Hu ..................... C08L 23/0876

OTHER PUBLICATIONS

Lee, D. et al., "Development of high temperature comprehensive two dimensional liquid chromatography hyphenated with infrared and light scatteriing detectors for characterization of chemical composition and molecurlar weight heterogeneities in polyolefin copolymers" Journal of Chromatography. A, 1218(40), 7173-79, 2011.
Brun, Yefim, and Foster, Peggy. "Characterization of synthetic copolymers by interaction polymer chromatography: Separation by microstructure" Journal of Separation Science 33(22), 3501-10, 2010.
Willaims T. and Ward I.M. "The Construction of a Polyethylene Calibration Curve for Gel Permeation Chromatography Using Polystyrene Fractions" Journal of Polymer Science Part C: Polymer Letters, 6(9) 621-24, 1968.
PCT/US2017/024777, International Preliminary Report on Patentability dated Jun. 12, 2017.
PCT/US17/024777 , Written Opinion dated May 10, 2017.
PCT/US17/024777 , Search Report dated May 10, 2017.
Lee, D. et al., "Development of high temperature comprehensive two dimensional liquid chromatography hyphenated with infrared and light scattering detectors for characterization of chemical composition and molecurlar weight heterogeneities in polyolefin copolymers" Journal of Chromatography. A, 1218(40), 7173-79, 2011.

* cited by examiner

POLYOLEFIN BLENDS INCLUDING CRYSTALLINE BLOCK COMPOSITES FOR PVC-FREE WEAR LAYERS

CROSS-REFERENCE TO RELATED APPLICATIONS

This application is a national phase application of International Application No. PCT/US2017/024777, filed on Mar. 29, 2017, which claims the benefit of U.S. Provisional Application No. 62/315,911, filed on Mar. 31, 2016.

FIELD

Embodiments relate to polyolefin blends that include a propylene component, a polymeric ethylene ionomer, and a crystalline block composite (CBC) compatibilizer.

INTRODUCTION

Luxury vinyl tile (LVT) is one of the fastest growing segments in the flooring market taking shares from laminates, true hardwood, and other vinyl segments. These tiles and planks are typically composed of a highly filled base layer below a decorative film which is in turn covered by a clear wear layer. The most common polymer used for LVT wear layers is Plasticized Polyvinyl chloride (P-PVC). However, growing environmental concerns centered on plasticizer emissions (both during manufacture and end-use) and the recyclability/reprocessing issues of P-PVC have urged manufacturers to look for replacements for P-PVC. Another environmental issue with PVC LVT is that when it burns, hazardous halogen-containing products of combustion, such as hydrogen chloride, can be formed. Accordingly, a need exists for wear layers for halogen-free LVT resilient flooring that would eliminate the potential for formation of hydrogen chlorine when the flood covering is burned. A need also exists for wear layers for LVT flooring which do not contain liquid plasticizers, are recyclable, and meet the key performance requirements of LVT, such as scratch/abrasion resistance, optical clarity, printability/paintability (e.g., adhesion to ink), and flexibility.

To meet the above-noted needs, polypropylene (e.g., random copolymer polypropylene (RCP)) has been used as wear layers in the LVT industry. RCP provides decent scratch/abrasion resistance, good clarity, and flexibility. However, RCP is limited by its poor printability/paintability. Ionomer, on the other hand, has also been used as wear layers in the LVT industry due to its excellent scratch/abrasion resistance, optical clarity, and printability/paintability. However, ionomer is not a cost effective solution due to its high costs. Incorporating RCP into ionomer and lowering the ionomer content could improve the costs, but the incompatibility between polypropylene and ionomer leads to poor mechanical properties of the alloy. Accordingly, a need exists for compatibilized polyolefin blends of polypropylene and ionomer that exhibit improved mechanical properties and possess excellent abrasion resistance, good scratch/mar resistance, good optical clarity, and good printability/paintability.

SUMMARY

Disclosed herein is a composition comprising:
(A) from 10 wt % to 90 wt % of a polymeric ethylene ionomer;
(B) from 10 wt % to 40 wt % of a propylene component including at least one propylene based polymer having a propylene content of at least 50.0 wt %, based on the total weight of the propylene based polymer, and a melt flow rate from 0.5 g/10 min to 200.0 g/10 min (according to ASTM D-1238 at 230° C./2.16 kg);
(C) from 5 wt % to 20 wt % of a crystalline block composite comprising (i) a crystalline ethylene based polymer, (ii) a crystalline alpha-olefin based polymer derived from at least one of a $C_{3-10}$ alpha-olefin, and (iii) a block copolymer comprising a crystalline ethylene block and a crystalline alpha-olefin block, the crystalline ethylene block of the block copolymer having the same composition as the crystalline ethylene based polymer of the crystalline block composite, and the crystalline alpha-olefin block of the block copolymer having the same composition as the crystalline alpha-olefin based polymer of the crystalline block composite.

In further embodiments, the composition of the present disclosure further comprises (D) from 0.1 wt % to 5 wt % of an antioxidant.

DETAILED DESCRIPTION

Embodiments relate to a composition that includes a polymeric ethylene ionomer, a propylene component, and a crystalline block composite (CBC) compatibilizer.

Terms

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As used with respect to a chemical compound, unless specifically indicated otherwise, the singular includes all isomeric forms and vice versa.

All references to the Periodic Table of the Elements herein shall refer to the Periodic Table of the Elements, published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight. For purposes of United States patent practice, the contents of any patent, patent application, or publication referenced herein are hereby incorporated by reference in their entirety (or the equivalent US version thereof is so incorporated by reference) especially with respect to the disclosure of synthetic techniques, definitions (to the extent not inconsistent with any definitions provided herein) and general knowledge in the art.

"Composition" and like terms mean a mixture or blend of two or more components. "Blend," "polymer blend," and like terms mean a blend of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

"Polymer" means a compound prepared by polymerizing monomers, whether of the same or a different type. The generic term polymer embraces the term homopolymer, usually employed to refer to polymers prepared from only one type of monomer, and the term interpolymer and copolymer as defined below. It also encompasses all forms of interpolymers, e.g., random, block, homogeneous, heterogeneous, etc.

"Interpolymer" and "copolymer" mean a polymer prepared by the polymerization of at least two different types of monomers. These generic terms include both classical copolymers, i.e., polymers prepared from two different types of monomers, and polymers prepared from more than two different types of monomers, e.g., terpolymers, tetrapolymers, etc. The terms "ethylene/alpha-olefin copolymer" and "propylene/alpha-olefin copolymer" are indicative of the terms "interpolymer" and "copolymer" used herein.

"Units derived from ethylene," "ethylene content," and like terms mean the units of a polymer that formed from the polymerization of ethylene monomers. "Units derived from α-olefin," "alpha-olefin content," "α-olefin content," and like terms mean the units of a polymer that formed from the polymerization of specific α-olefin monomers, in particular at least one of a $C_{3-10}$ α-olefin. "Units derived from propylene," "propylene content," and like terms mean the units of a polymer that formed from the polymerization of propylene monomers.

"Propylene based polymer," and like terms mean a polymer that comprises a majority weight percent polymerized propylene monomer, also referred to as units derived from propylene (based on the total amount of polymerizable monomers), and optionally comprises at least one polymerized comonomer different from propylene (such as at least one selected from a $C_2$ and $C_{4-10}$ α olefin) so as to form a propylene-based interpolymer. For example, when the propylene-based polymer is a copolymer, the propylene content is greater than 50 wt %, based on the total weight of the copolymer.

"Ethylene based polymer" and like terms mean a polymer that comprises a majority weight percent polymerized ethylene monomer, also referred to as units derived from ethylene (based on the total weight of polymerizable monomers), and optionally may comprise at least one polymerized comonomer different from ethylene (such as at least one selected from a $C_{3-10}$ α olefin) so as to form an ethylene-based interpolymer. For example, when the ethylene-based polymer is a copolymer, the amount of ethylene is greater than 50 wt %, based on the total weight to the copolymer.

The term "polyethylene" includes homopolymers of ethylene and copolymers of ethylene and one or more $C_{3-8}$ α-olefins in which ethylene comprises at least 50 mole percent. The term "polypropylene" includes homopolymers of propylene such as isotactic polypropylene, syndiotactic polypropylene, and copolymers of propylene and one or more $C_{2, 4-8}$ α-olefins in which propylene comprises at least 50 mole percent. Preferably, a plurality of the polymerized monomer units of at least one block or segment in the polymer (a crystalline block) comprise propylene, preferably at least 90 mole percent, more preferably at least 93 mole percent, and most preferably at least 95 mole percent. A polymer made primarily from a different α-olefin, such as 4-methyl-1-pentene would be named similarly.

"Random copolymer polypropylene" (RCP) and like terms mean a propylene/alpha-olefin interpolymer in which the units derived from the alpha-olefin monomer are randomly distributed across the polymer chain, as opposed to distributed across the polymer chain in an alternating, periodic, or block pattern. In contrast, "homogenous propylene-based interpolymer" and like terms mean a propylene/alpha-olefin interpolymer in which the units derived from the alpha-olefin monomer are approximately evenly distributed across the polymer chains of the bulk polymer.

The term "crystalline block composite" (CBC) refers to polymers comprising a crystalline ethylene based polymer (CEP) having an ethylene content of greater than 90 mol %, a crystalline alpha-olefin based polymer (CAOP) having an alpha-olefin content of greater than 90 mol %, and a block copolymer (i.e., diblock) having a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. The compositional split between the amount of CEP and CAOP will be essentially the same as that between the corresponding blocks in the block copolymer. In exemplary embodiments, the alpha-olefin is propylene. In further embodiments, the CAOB and the CEB may be an iPP-EP (isotactic polypropylene and ethylene-propylene) diblock copolymer.

"Block copolymer" or "segmented copolymer" refers to a polymer comprising two or more chemically distinct regions or segments (referred to as "blocks") joined in a linear manner, that is, a polymer comprising chemically differentiated units that are joined (covalently bonded) end-to-end with respect to polymerized functionality (e.g., polymerized propylenic functionality), rather than in pendent or grafted fashion. Block copolymers comprise sequences ("blocks") of the same monomer unit, covalently bound to sequences of unlike type. The blocks can be connected in a variety of ways, such as A-B in diblock and A-B-A triblock structures, where A represents one block and B represents a different block. In a multi-block copolymer, A and B can be connected in a number of different ways and be repeated multiply. It may further comprise additional blocks of different type. Multi-block copolymers may be linear multi-block, multi-block star polymers (in which all blocks bond to the same atom or chemical moiety) or comb-like polymers where the B blocks are attached at one end to an A backbone. The block copolymers can be linear or branched. With respect to the block copolymers, the blocks may differ in the amount of comonomer incorporated therein. The blocks may also differ in the type of comonomer, density, the amount of crystallinity, the crystallite size attributable to a polymer of such composition, the type or degree of tacticity (isotactic or syndiotactic), regio-regularity or regio-irregularity, the amount of branching, including long chain branching or hyper-branching, the homogeneity, or any other chemical or physical property. The block copolymers are characterized by unique distributions of polymer polydispersity (PDI or Mw/Mn), block length distribution, and/or block number distribution, e.g., due to the effect of the shuttling agent(s) in combination with the catalyst(s).

The term "crystalline" refers to a polymer or polymer block that possesses a first order transition or crystalline melting point (Tm) as determined by differential scanning calorimetry (DSC) or equivalent technique. The term may be used interchangeably with the term "semicrystalline".

The term "crystallizable" refers to a monomer that can polymerize such that the resulting polymer is crystalline. Crystalline ethylene polymers typically have, but are not limited to, densities of 0.89 g/cc to 0.97 g/cc and melting points of 75° C. to 140° C. Crystalline propylene polymers may have, but are not limited to, densities of 0.88 g/cc to 0.91 g/cc and melting points of 100° C. to 170° C.

The term "amorphous" refers to a polymer lacking a crystalline melting point as determined by differential scanning calorimetry (DSC) or equivalent technique.

The term "isotactic" is defined as polymer repeat units having at least 70 percent isotactic pentads as determined by $^{13}$C-NMR analysis. "Highly isotactic" is defined as polymers having at least 90 percent isotactic pentads.

Polymeric Ionomer

The composition includes a polymeric ionomer. The amount of the polymeric ionomer in the composition is from 10 wt % to 90 wt % (e.g., from 20 wt % to 80 wt %, from 30 wt % to 70 wt %, and/or from 40 wt % to 60 wt %). In exemplary embodiments, the polymeric ionomer of the composition may be an ethylene containing ionomer, also referred to as a polymeric ethylene ionomer. For example, the ethylene ionomer comprises an acrylic acid ethylene copolymer that is neutralized with a metal salt (e.g., by using a cation). The presence of the ionomer may facilitate the development of scratch resistance in articles that are manufactured from the composition.

The acrylic acid ethylene copolymer is a polymer that can comprise repeat units in an amount of 5 to 40 wt % by weight of a polar monomer such as acrylic acid, alkyl acrylic acid, or alkyl acrylate (additional examples are provided below), or combinations thereof, based on the total weight of the ethylene copolymer. The alkyl group may comprise 1 to 20 carbon atoms. The remainder of the copolymer is an ethylene polymer. Ethylene polymers including ethylene-α-olefin copolymers (defined above) may be used in the acrylic acid ethylene copolymer or in the ethylene ionomers (detailed below). The acrylic acid ethylene copolymer is either a random or block copolymer and is preferably a random copolymer.

Examples of such polar monomers include acrylic acid, methacrylic acid, ethacrylic acid, methyl acrylate, ethyl acrylate, methyl methacrylate, ethyl methacrylate, propyl acrylate, propyl methacrylate, isopropyl acrylate, isopropyl methacrylate, butyl acrylate, butyl methacrylate, isobutyl acrylate, isobutyl methacrylate, tert-butyl acrylate, tert-butyl methacrylate, octyl acrylate, octyl methacrylate, undecyl acrylate, undecyl methacrylate, octadecyl acrylate, octadecyl methacrylate, dodecyl acrylate, dodecyl methacrylate, 2-ethylhexyl acrylate, 2-ethylhexyl methacrylate, isobornyl acrylate, isobornyl methacrylate, lauryl acrylate, lauryl methacrylate, 2-hydroxyethyl acrylate, 2-hydroxyethyl methacrylate, glycidyl acrylate, glycidyl methacrylate, poly(ethylene glycol)acrylate, poly(ethylene glycol)methacrylate, poly(ethylene glycol) methyl ether acrylate, poly(ethylene glycol) methyl ether methacrylate, poly(ethylene glycol) behenyl ether acrylate, poly(ethylene glycol) behenyl ether methacrylate, poly(ethylene glycol) 4-nonylphenyl ether acrylate, poly(ethylene glycol) 4-nonylphenyl ether methacrylate, poly(ethylene glycol) phenyl ether acrylate, poly(ethylene glycol) phenyl ether methacrylate, dimethyl maleate, diethyl maleate, dibutyl maleate, dimethyl fumarate, diethyl fumarate, dibutyl fumarate, dimethyl fumarate, vinyl acetic acid, vinyl acetate, vinyl propionate, or combinations thereof.

The ethylene copolymer may comprise up to 35 wt % of an optional comonomer such as carbon monoxide, sulfur dioxide, acrylonitrile, maleic anhydride, maleic acid diesters, (meth)acrylic acid, maleic acid, maleic acid monoesters, itaconic acid, fumaric acid, fumaric acid monoester, a salt of these acids, glycidyl acrylate, glycidyl methacrylate, and glycidyl vinyl ether, or combinations thereof.

In an embodiment, the acid moiety of an ethylene copolymer is neutralized with a cation to produce the ionomer. The neutralization, for example, can be 0.1 to 100, preferably 10 to 90, preferably 20 to 80, and more preferably 40 to about 60 wt %, based on the total carboxylic acid content, with a metallic ion. The metallic ions can be monovalent, divalent, trivalent, multivalent, or combinations of two or more thereof. Examples include Li, Na, K, Ag, Hg, Cu, Be, Mg, Ca, Sr, Ba, Cd, Sn, Pb, Fe, Co, Zn, Ni, Al, Sc, Hf, Ti, Zr, Ce, or combinations thereof. If the metallic ion is multivalent, a complexing agent, such as stearate, oleate, salicylate, and phenolate radicals can be included. Exemplary metallic ions are Na, Ca or Zn.

The ionomer can also be a blend of an ionomer having a greater than 60% neutralization and, for example, an ethylene (meth)acrylic acid copolymer to achieve the desired degree of neutralization.

The melt index of the polymeric ionomer of the presently disclosed composition may be from 0.5 g/10 min to 100 g/10 min (e.g., from 0.5 g/10 min to 50 g/10 min, from 0.5 g/10 min to 25 g/10 min, from 0.5 g/10 min to 10 g/10 min, and/or from 0.5 g/10 min to 5 g/10 min), according to ASTM D-1238 (190° C., 2.16 kg).

The density of the polymeric ionomer of the presently disclosed composition may be from 0.920 g/cc to 0.995 g/cc (e.g., from 0.930 g/cc to 0.990 g/cc, from 0.940 g/cc to 0.985 g/cc, and/or from 0.950 g/cc to 0.980 g/cc), according to ASTM D792.

Examples of ethylene copolymers that are neutralized to produce the ionomer include ethylene/methyl acrylate (EMA), ethylene/ethyl acrylate (EEA), ethyl acrylate (EA), ethylene/butyl acrylate (EBA), ethylene/isobutyl acrylate/methacrylic acid, ethylene/methyl acrylate/maleic anhydride, ethylene/butyl acrylate/glycidyl methacrylate (EBAGMA) and ethylene/butyl acrylate/carbon monoxide (EBACO), and butylacrylate (BA). Examples of commercially available ethylene ionomers include those available from E. I. du Pont de Nemours and Company (DuPont), Wilmington, Del., commercially marketed as SURLYN® and from The Dow Chemical Company, commercially marketed as AMPLIFY™ IO.

Propylene Component

The composition includes from 10 wt % to 40 wt % (e.g., from 15 wt % to 40 wt %, from 20 wt % to 40 wt %, and/or from 30 wt % to 40 wt %) of a propylene component. The propylene component includes one or more propylene based polymers having a propylene content of at least 50.0 wt %, based on the total weight of the propylene based polymer. The one or more propylene based polymer has a melt flow rate from 0.1 g/10 min to 100 g/10 min (e.g., from 0.1 g/10 min to 80 g/10 min, 0.1 g/10 min to 50 g/10 min, 0.5 g/10 min to 20 g/10 min, and/or 0.5 g/10 min to 10 g/10 min), according to ASTM D-1238 at 230° C., 2.16 kg. The propylene based polymer may have a density, in accordance with ASTM D792-00, Method 13, from 0.870 g/cm$^3$ to 0.910 g/cm$^3$ (e.g., from 0.880 g/cm$^3$ to 0.905 g/cm$^3$, from 0.885 g/cm$^3$ to 0.905 g/cm$^3$, and/or from 0.890 g/cm$^3$ to 0.905 g/cm$^3$). The propylene based component may consist of heterogeneous polypropylene or homogeneous polypropylene.

Each of the one of more propylene based polymers may be a propylene homopolymer, propylene based interpolymers, a random copolymer polypropylene (RCPP), an impact copolymer polypropylene (e.g., homopolymer propylene modified with at least one elastomeric impact modifier) (ICPP), a high impact polypropylene (HIPP), a high melt strength polypropylene (HMS-PP), an isotactic polypropylene (iPP), a syndiotactic polypropylene (sPP), or a combination thereof. In exemplary embodiments, the one or more propylene based polymers may be in the isotactic form of homopolymer polypropylene, although other forms of polypropylene may be used (e.g., syndiotactic or atactic).

Exemplary propylene based interpolymers (such as RCP), may contain 1 wt % and up to 50 wt % of ethylene and/or an alpha-olefin comonomer of 4 to 20 carbon atoms (e.g., $C_2$ and $C_4$-$C_{10}$ alpha-olefins). All individual values and subranges from 1 and up to 50 wt % are included herein and disclosed herein; e.g., the comonomer content can be from a lower limit of 1 wt %, 3 wt %, 4 wt %, 5 wt %, 7 wt %, or 9 wt % to an upper limit of 40 wt %, 35 wt %, 30 wt %, 27 wt %, 20 wt %, 15 wt %, 12 wt %, or 9 wt %. For example, the propylene/alpha-olefin copolymer comprises from 1 to 35 wt %, 1 to 30 wt %, 3 to 27 wt %, 3 to 20 wt %, and/or 3 to 15 wt % of one or more alpha-olefin comonomers.

The one or more propylene-based polymers are formed without the use of a chain shuttling agent, as discussed below with respect to the crystalline block composite. Exemplary comonomers for polymerizing with propylene include ethylene, 1-butene, 1 pentene, 1-hexene, 1-heptene, 1-octene, 1-nonene, 1-decene, 1-unidecene, 1 dodecene, as well as 4-methyl-1-pentene, 4-methyl-1-hexene, 5-methyl-1-hexene, vinylcyclohexane, and styrene. Exemplary comonomers include ethylene, 1-butene, 1-hexene, and 1-octene. Exemplary propylene based interpolymers include propylene/ethylene, propylene/1-butene, propylene/1-hexene, propylene/4-methyl-1-pentene, propylene/l-octene, propylene/ethylene/1-butene, propylene/ethylene/ENB, propylene/ethylene/1-hexene, propylene/ethylene/l-octene, propylene/styrene, and propylene/ethylene/styrene. Optionally, the propylene-based polymer include a monomer having at least two double bonds such as dienes or trienes.

An exemplary discussion of various polypropylene polymers is contained in Modern Plastics Encyclopedia/89, mid October 1988 Issue, Volume 65, Number 11, pp. 86-92, the entire disclosure of which is incorporated herein by reference. Examples of such propylene based polymers include VERSIFY™ (available from The Dow Chemical Company), Vistamaxx™ (available from Exxon Mobil), INSPIRE™ (available from Braskem), and Pro-Fax (available from LyondellBasell).

In exemplary embodiments, the propylene-based polymer may be a propylene-alpha-olefin copolymer, which is characterized as having substantially isotactic propylene sequences. "Substantially isotactic propylene sequences" means that the sequences have an isotactic triad (mm) measured by $^{13}$C NMR of greater than 0.85; in the alternative, greater than 0.90; in another alternative, greater than 0.92; and in another alternative, greater than 0.93.

Similarly as discussed with respect to the ethylene-based polymers, the propylene-based polymers may contain LCB. For example, the propylene-based polymer may contain an average of at least 0.001, an average of at least 0.005 and/or an average of at least 0.01, long chain branches/1000 total carbons. The term long chain branch, as used herein, refers to a chain length of at least one (1) carbon more than a short chain branch, and short chain branch, as used herein with regard to propylene/alpha-olefin copolymers, refers to a chain length of two (2) carbons less than the number of carbons in the comonomer. For example, a propylene/l-octene interpolymer has backbones with long chain branches of at least seven (7) carbons in length, but these backbones also have short chain branches of only six (6) carbons in length.

Crystalline Block Composite

The composition includes from 5 wt % to 20 wt % of a crystalline block composite (CBC) compatibilizer. In exemplary embodiments, the crystalline block composite may have a total ethylene content that is from 40 wt % to 70 wt % based on the total weight of the crystalline block composite. The remainder of the total weight of the crystalline block composite may be accounted for by units derived from at least one $C_{3-10}$ alpha-olefin. For example, the remainder of the total weight of the crystalline block composite may be accounted for by units derived from propylene.

The term crystalline block composite (CBC) refers to polymers having a crystalline ethylene based polymer (CEP), a crystalline alpha-olefin based polymer (CAOP), and a block copolymer comprising a crystalline ethylene block (CEB) and a crystalline alpha-olefin block (CAOB), wherein the CEB of the block copolymer is the same composition as the CEP of the crystalline block composite and the CAOB of the block copolymer is the same composition as the CAOP of the crystalline block composite. Additionally, the compositional split between the amount of CEP and CAOP will be essentially the same as that between the corresponding blocks in the block copolymer.

The crystalline block composite (CBC) includes the crystalline ethylene based polymer (CEP), the crystalline alpha-olefin based polymer (CAOP), and the block copolymer having the crystalline ethylene block (CEB) and the crystalline alpha-olefin block (CAOB), where the CEB is the same composition as the CEP and the CAOB is the same composition as the CAOP. In the crystalline block composite, the alpha-olefin is at least one selected from the group of $C_{3-10}$ α-olefins (e.g., may be propylene and/or butylene). The CAOP and the CAOB may have an alpha-olefin content that is greater than 90 mol %. The CEP and CEB comprise greater than 90 mol % of units derived from ethylene (i.e., ethylene content), and any remainder may be at least one of selected from the group of $C_{3-10}$ α-olefins as a comonomer (in an amount less than 10 mol %, less than 7 mol %, less than 5 mol %, less than 3 mol %, etc.).

In exemplary embodiments, the CAOP and CAOB include propylene, e.g., greater than 90 mol % units derived from propylene and any remainder may be ethylene and/or at least one of selected from the group of $C_{4-10}$ α-olefins as a comonomer (in an amount less than 10 mol %, less than 7 mol %, less than 5 mol %, less than 4 mol %, less than 4 mol %, etc.). The CEP and CEB include ethylene, e.g., greater than 90 mol % units derived from ethylene and any remainder may be propylene and/or at least one of selected from the group of $C_{4-10}$ α-olefins as a comonomer (in an amount less than 10 mol %, less than 7 mol %, less than 5 mol %, less than 4 mol %, less than 4 mol %, etc.). The compositional split between the amount of CEP and CAOP will be essentially the same as that between the corresponding blocks in the block copolymer. The CEB and the CAOB may be referred to as hard (crystalline) segments/blocks.

In exemplary embodiments, the CAOB refers to highly crystalline blocks of polymerized alpha olefin units in which units derived from the monomer that is one of $C_{3-10}$ α-olefins are present in an amount greater than 90 mol %, greater than 93 mol %, greater than 95 mol %, and/or greater than 96 mol %. In other words, the comonomer content in the CAOB is less than 10 mol %, less than 7 mol %, less than 5 mol %, and/or less than 4 mol %. A CAOB with propylene crystallinity may have corresponding melting points that are 80° C. and above, 100° C. and above, 115° C. and above, and/or 120° C. and above. In some embodiments, the CAOB comprises all or substantially all propylene units. CEB refers to blocks of polymerized ethylene units in which the comonomer content (such as propylene) is 10 mol % or less, between 0 mol % and 10 mol %, between 0 mol % and 7 mol %, and/or between 0 mol % and 5 mol %. Said in another way, the CEB is derived from at least 90 mol % ethylene, greater than 90 mol % ethylene, greater than 93 mol % ethylene, and/or greater than 95 mol % ethylene. Such CEBs have corresponding melting points that may be 75° C. and above, 90° C. and above, and/or 100° C. and above.

In an exemplary embodiment, the CAOB may refer to highly crystalline blocks of polymerized alpha olefin units in which the monomer that is one of $C_{3-10}$ α-olefins is present in an amount of at least 88 wt % and/or at least 90 wt %. In other words, the comonomer content in the CAOBs is less than 10 wt %. CEB may refer to blocks of polymerized ethylene units in which the comonomer content (such as propylene) is 10 wt % or less.

Crystalline block composites may be differentiated from conventional, random copolymers, physical blends of polymers, and block copolymers prepared via sequential monomer addition. The crystalline block composites may be differentiated from random copolymers and from a physical blend by characteristics such as crystalline block composite index, better tensile strength, improved fracture strength, finer morphology, improved optics, and/or greater impact strength at lower temperature. The crystalline block composites may be differentiated from block copolymers prepared by sequential monomer addition by molecular weight distribution, rheology, shear thinning, rheology ratio, and block polydispersity. A unique feature of crystalline block composites is that they cannot be fractionated by conventional means by solvent or temperature such as xylene fractionation, solvent/non-solvent, or temperature rising elution fractionation or crystallization elution fractionation since the individual blocks of the block copolymer are crystalline.

When produced in a continuous process, the crystalline block composites desirably possess PDI from 1.7 to 15 (e.g., from 1.8 to 10 and/or from 1.8 to 5). Exemplary crystalline block composites are described in, e.g., US Patent Application Publication Nos. 2011-0313106, 2011-0313107, and 2011-0313108, with reference to descriptions of the crystalline block composites, processes to make them, and methods of analyzing them. In exemplary embodiments, the crystalline block composite may have a molecular weight distribution (MWD), defined as weight average molecular weight divided by number average molecular weight ($M_w/M_n$) of 10.0 or less, 7.0 or less, from 2.0 to 6.0, and/or from 3.0 to 5.0.

The alpha-olefin of the crystalline block composite polymers may be propylene, 1-butene, or 4-methyl-1-pentene and one or more comonomers. For example, the crystalline block composites comprise in polymerized form propylene and ethylene and/or one or more $C_{4-20}$ α-olefin comonomers, and/or one or more additional copolymerizable comonomers or they comprise 4-methyl-1-pentene and ethylene and/or one or more $C_{4-10}$ α-olefin comonomers, or they comprise 1-butene and ethylene, propylene and/or one or more $C_5$-$C_{10}$ α-olefin comonomers and/or one or more additional copolymerizable comonomers. Additional exemplary comonomers are selected from diolefins, cyclic olefins, and cyclic diolefins, halogenated vinyl compounds, and vinylidene aromatic compounds. In an exemplary embodiment, the monomer is propylene and the comonomer is ethylene.

Crystalline Block Composite Index (CBCI) provides an estimate of the quantity of the block copolymer within the crystalline block composite. The CBCI for the crystalline block composite is greater than 0 and less than 1.0. For example, the CBCI is from 0.2 to 0.99, from 0.3 to 0.99, from 0.4 to 0.99, and/or from 0.5 to 0.99. For example, the crystalline block composite comprises from 0.5 to 95 wt % CEP, from 0.5 to 95 wt % CAOP, and from 5 to 99 wt % of the block copolymer. For example, the crystalline block composite comprise from 0.5 to 80 wt % CEP, from 0.5 to 80 wt % CAOP and from 20 to 90 wt % of the block copolymer. Weight percents are based on total weight of crystalline block composite. The sum of the weight percents of CEP, CAOP, and block copolymer equals 100%.

The crystalline block composite may have, a Tm (crystalline melting point) greater than 90° C. (e.g., for both a first peak and a second peak), a Tm greater than 100° C. (e.g., for both a first peak and a second peak), greater than 120° C. (e.g., for at least one of a first peak and a second peak), and/or greater than 125° C. (e.g., for at least one of a first peak and a second peak).

The MFR (melt flow rate) of the crystalline block composites is from 0.1 to 1000 g/10 min, from 1 to 500 g/10 min kg), from 1 to 100 g/10 min, from 1 to 75 g/10 min, from 1 to 60 g/10 min, from 3 to 60 g/10 min, and/or from 3 to 30 g/10 min, according to ASTM D1238 (230° C./2.16 kg).

The crystalline block composite have a weight average molecular weight (Mw) from 10,000 g/mol to 2,500,000 g/mol, from 35000 g/mol to 1,000,000 g/mol, from 50,000 g/mol to 300,000 g/mol, from 50,000 g/mol to 200,000 g/mol, and/or from 50,000 g/mol to 150,000 g/mol. For example, the Mw may be from 20 kg/mol to 1000 kg/mol, from 50 kg/mol to 500 kg/mol, and/or from 80 kg/mol to 125 kg/mol.

The crystalline block composite may have, in accordance with ASTM D792, a density from 0.850 g/cc to 0.920 g/cc (e.g., from 0.875 g/cc to 0.920 g/cc, from 0.890 g/cc to 0.910 g/cc, and/or from 0.900 g/cc to 0.910 g·cc).

The crystalline block composite polymers may be prepared by a process comprising contacting an addition polymerizable monomer or mixture of monomers under addition polymerization conditions with a composition comprising at least one addition polymerization catalyst, at least one cocatalyst, and a chain shuttling agent, said process being characterized by formation of at least some of the growing polymer chains under differentiated process conditions in two or more reactors operating under steady state polymerization conditions or in two or more zones of a reactor operating under plug flow polymerization conditions. The term, "shuttling agent" refers to a compound or mixture of compounds that is capable of causing polymeryl exchange between at least two active catalyst sites under the conditions of the polymerization. That is, transfer of a polymer fragment occurs both to and from one or more of the active catalyst sites. In contrast to a shuttling agent, a "chain transfer agent" causes termination of polymer chain growth and amounts to a one-time transfer of growing polymer from the catalyst to the transfer agent. In a preferred embodiment, the crystalline block composites comprise a fraction of block polymer which possesses a most probable distribution of block lengths.

Suitable processes useful in producing the crystalline block composites may be found, for example, in U.S. Patent Application Publication No. 2008/0269412, published on Oct. 30, 2008. In particular, the polymerization is desirably carried out as a continuous polymerization, preferably a continuous, solution polymerization, in which catalyst components, monomers, and optionally solvent, adjuvants, scavengers, and polymerization aids are continuously supplied to one or more reactors or zones and polymer product continuously removed therefrom. Within the scope of the terms "continuous" and "continuously" as used in this context are those processes in which there are intermittent additions of reactants and removal of products at small regular or irregular intervals, so that, over time, the overall process is substantially continuous. The chain shuttling agent(s) may be added at any point during the polymerization including in the first reactor or zone, at the exit or slightly before the exit of the first reactor, or between the first reactor or zone and the second or any subsequent reactor or zone. Due to the difference in monomers, temperatures, pressures or other difference in polymerization conditions between at least two of the reactors or zones connected in series, polymer segments of differing composition such as comonomer content, crystallinity, density, tacticity, regio-regularity, or other chemical or physical difference, within the same molecule are formed in the different reactors or zones. The size of each segment or block is determined by continuous polymer reaction conditions, and preferably is a most probable distribution of polymer sizes.

When producing a block polymer having a crystalline ethylene block (CEB) and a crystalline alpha-olefin block (CAOB) in two reactors or zones it is possible to produce the CEB in the first reactor or zone and the CAOB in the second reactor or zone or to produce the CAOB in the first reactor or zone and the CEB in the second reactor or zone. It may be more advantageous to produce CEB in the first reactor or zone with fresh chain shuttling agent added. The presence of increased levels of ethylene in the reactor or zone producing CEB may lead to much higher molecular weight in that reactor or zone than in the zone or reactor producing CAOB. The fresh chain shuttling agent will reduce the MW of polymer in the reactor or zone producing CEB thus leading to better overall balance between the length of the CEB and CAOB segments.

When operating reactors or zones in series it is necessary to maintain diverse reaction conditions such that one reactor produces CEB and the other reactor produces CAOB. Carryover of ethylene from the first reactor to the second reactor (in series) or from the second reactor back to the first reactor through a solvent and monomer recycle system is preferably minimized There are many possible unit operations to remove this ethylene, but because ethylene is more volatile than higher alpha olefins one simple way is to remove much of the unreacted ethylene through a flash step by reducing the pressure of the effluent of the reactor producing CEB and flashing off the ethylene. An exemplary approach is to avoid additional unit operations and to utilize the much greater reactivity of ethylene versus higher alpha olefins such that the conversion of ethylene across the CEB reactor approaches 100%. The overall conversion of monomers across the reactors can be controlled by maintaining the alpha olefin conversion at a high level (90 to 95%).

Exemplary catalysts and catalyst precursors for use to from the crystalline block composite include metal complexes such as disclosed in, e.g., International Publication No WO 2005/090426. Other exemplary catalysts are also disclosed in US Patent Publication No. 2006/0199930, US 2007/0167578, and US 2008/0311812; U.S. Pat. No. 7,355, 089; and International Publication No. WO 2009/012215.

Composition

The polyolefin blend composition may be useful for preparing articles using known processes. For example, the compositions may be fabricated into parts, sheets or other article of manufacture, using any extrusion, calendering, blow molding, compression molding, injection molding, or thermoforming processes. The components of the composition may be fed to the process either pre-mixed, or the components may be fed directly into the process equipment, such as a converting extruder, such that the composition is formed therewithin. The compositions may be blended with another polymer, prior to fabrication of an article. Such blending may occur by any of a variety of conventional techniques, such as melt blending or dry blending of pellets of the compositions with pellets of another polymer.

The polyolefin blend compositions can optionally include one or more additives and/or fillers. Non-limiting examples of additives and/or fillers include plasticizers, thermal stabilizers, light stabilizers (e.g., UV light stabilizers and absorbers), antioxidants, slip agents, process aids, optical brighteners, antistats, lubricants, catalysts, rheology modifiers, biocides, corrosion inhibitors, dehydrators, organic solvents, colorants (e.g., pigments and dyes), surfactants, demolding additives, mineral oil, antiblocking agents, nucleating agents, flame retardants, reinforcing fillers (e.g., glass, fibers, anti-scratch additives, talc, calcium carbonate, mica, glass fibers, whisker, etc.), processing aids, and combinations thereof.

The polyolefin blend compositions may be compounded using, for example, a twin screw extruder, batch mixer, or single screw extruder.

In various embodiments, the compositions of the present disclosure have (i) a density of greater than or equal to 0.900 g/cc (e.g., greater than or equal to 0.910 g/cc, greater than or equal to 0.920 g/cc, and/or greater than or equal to 0.930 g/cc) in accordance with ASTM D792.

In various embodiments, the compositions of the present disclosure have (ii) a scratch resistance (5-finger) of greater than or equal to 3 (e.g., greater than or equal to 3.5) in accordance with ASTM Method D7027 and the methodology described below.

In various embodiments, the compositions of the present disclosure have (iii) a total (overall) haze of less than 90% (e.g., less than 85%, less than 80%, and/or less than 75%) in accordance with ASTM D1003-07 and the methodology described below.

In various embodiments, the compositions of the present disclosure have (iv) a tabor (or taber) abrasion of less than 0.450 g (e.g., less than 0.400 g, less than 0.350 g, less than 0.300 g, less than 0.250 g, less than 0.200 g, and/or less than 0.150 g) in accordance with ASTM Method D4060 and the methodology described below.

In various embodiments, the compositions of the present disclosure have (v) a tensile strength of greater than 1000 psi (e.g., greater than 1500 psi, greater than 1750 psi, and/or greater than 2000 psi) in accordance with ASTM D1708 and the methodology described below.

In various embodiments, the compositions of the present disclosure have (vi) a total surface energy of greater than 30 mN/m in accordance with the methodology described below.

In various embodiments, the compositions of the present disclosure have (vii) a polar component of less than 5 mN/m (e.g., less than 4 mN/m, less than 3 mN/m, and/or less than 2 mN/m) in accordance with the methodology described below.

In various embodiments the compositions of the present disclosure have (viii) good printability/paintability in accordance with the methodology described below.

In various embodiments, the compositions of the present disclosure can have one, some, or all of the above properties (i)-(viii).

EXAMPLES

Approximate conditions, properties, formulations etc., for the preparation of the Examples are provided below.

Test Methods

Density, in g/cm$^3$, of polymers as provided herein, is determined according to ASTM International ("ASTM")

method D792. Each sample was compression molded, as discussed below for the flexural modulus test. Isopropyl alcohol, at 23° C., was used for sample immersion. An average of the three (3) measurements was taken.

Melt index (MI) is measured in accordance with ASTM D-1238 (190° C.; 2.16 kg). The result is reported in grams/10 minutes.

Melt flow rate (MFR) is measured in accordance with ASTM D-1238 or ISO 1133 (230° C.; 2.16 kg). The result is reported in grams/10 minutes.

Total (Overall) Haze is measured according to using a Standard Test Method for Haze and Luminous Transmittance of Transparent Plastics, ASTM D1003-07. The percentage of luminous transmission which is passing through the specimen deviates from the incident beam by forward scattering. For the purpose of this method only, luminous flux deviating more than 2.5° on the average is considered haze. Five samples were prepared with surface areas of approximately 6"×6". The samples are chosen randomly across both axes to provide a more homogenous sample selection. The samples are placed in a ring fixture to remove surface wrinkles.

Scratch Resistance (5-Finger). Five finger scratch mar measurements were carried out according to ASTM Method D7027. It is a mechanically driven apparatus with a movable sledge and five metal fingers—250 mm long. The fingers used in this test method were 1.0±0.1 mm in diameter highly polished steel balls. Each pin was loaded with a different weight exerting standard force (1.38 N, 2.73 N, 5.44 N, 6.78 N, and 11.03 N) on the surface of the test material that was at least 140 mm in length and 10 mm in width. The appropriate weight was added to the top of each finger and weights were aligned according to the pin position and weight. Scratch depth measurements were acquired for each sample specimen at 11.03 N via laser scanning microscopy (LSM). LSM image data was collected using laser scanning microscope equipped with a 408 nm wavelength violet laser. A 20× objective lens was used for image acquisition and six images were stitched together and analyzed. The average of the five scratch depth measurements taken along the profile of scratch area was reported for each sample. Each measurement was taken from a flat area of the sample specimen to the middle of the scratch.

Tensile Strength/Modulus (Avg-10%), in psi, as stress-strain behavior in uniaxial tension, is determined using ASTM D1708 microtensile specimens. The plaques used for microtensile testing were prepared by compression molding using a Tetrahedron press. The polymer was pre-melted at 190° C. for 1 minute at 5 klb, pressed for 5 minutes at 30 klb, and then cooled between cold plates at 17° C. for 1 minute. The gauge length of samples was 22 mm and samples were stretched with an Instron at 554% min-1 at 23° C. Tensile strength and elongation at break were reported for an average of 5 specimens. The nominal plaque thickness was 5 mm.

Taber abrasion. Taber abrasion measurements were carried out according to ASTM Method D4060. Five sample specimens were prepared using a 4" round cutting tool Five 4" round specimens with a ⁵⁄₁₆" hole in the center were conditioned in the ASTM lab for 40 hours, weighed and then abraded for 1000 cycles using the H-18/Calibrade abrading wheel at 72±2 rpm. The abrasion process was paused ever 300 cycles and the abrading wheel was cleaned. This was done in order to remove residual product and maintain the proper level of force from the abrading wheel during each test.

Surface Energy and Polar Component: A sample of ~3×2 cm was cut from the POE plaques to perform the contact angle measurements. The contact angles of both water and diiodomethane were measured on a Dataphysics OCA20 contact angle system with a drop volume of 2 uL. 5 drops were taken for each liquid across the sample for statistical purposes. A linear baseline was drawn at the drop-surface interface, and the contact angle with the substrate extracted by fitting the drop profile with a circle fitting method. The theory for calculating the polar and non-polar components of the total surface energy used the Owens-Wendt Theory, described below. It relates the contact angle to a linear equation which can be fit to extract the polar component of a surface and the dispersive component. When fit, the slope is the square root of the polar component and the intercept is the square root of the dispersive component. The two are added together to get the total surface energy.

Owens Wendt Theory: The Owen's Wendt Theory for calculation of total surface energy and polar/dispersive components requires the use of at least two liquids, one with a polar component and one entirely dispersive. The equation relates the measured contact angle to the surface energies of both the solid, liquid and the interfacial tension between the two. The interfacial tension between two known liquids of various polar and dispersive components and the surface can give you the polar and dispersive components of that surface. The principle equation is shown below:

$$\frac{\sigma_L(\cos\theta + 1)}{2\sqrt{\sigma_L^D}} = \frac{\sqrt{\sigma_S^P}\sqrt{\sigma_L^P}}{\sqrt{\sigma_L^D}} + \sqrt{\sigma_S^D}$$

And it follows the form of a linear equation of y=mx+b with:

$$y = \frac{\sigma_L(\cos\theta + 1)}{2\sqrt{\sigma_L^D}}$$

$$m = \sqrt{\sigma_S^P}$$

$$x = \frac{\sqrt{\sigma_L^P}}{\sqrt{\sigma_L^D}}$$

$$b = \sqrt{\sigma_S^D}$$

And with $\sigma_S^P$=polar component of surface; $\sigma_S^D$=dispersive component of surface; $\sigma_L^P$=polar component of liquid; and $\sigma_L^D$=dispersive component of liquid.

The liquids used were water ($\sigma$=72.8 mNim, $\sigma^P$=51 mN/m and $\sigma^D$=21.8 mN/m) which has a significant polar component and diiodomethane ($\sigma$=50.8 mNim, $\sigma^P$=0 mN/m and $\sigma^D$=50.8 mN/m) which has no polar component. The contact angles taken with water and the contact angles with diiodomethane were input in the equation and fit a line, the Y-intercept gives the dispersive component and the slope gives the polar component of the surface.

Printability/Paintability refers to how well the paint (ink) adheres to the substrate. High adhesion force to paint is required for a durable protective wear layer. Typically, there is no chemical adhesion between paint and the wear layer. The adhesion force develops from the adsorption of paint molecules on the substrate and the resulting attractive forces, usually designated as secondary or van der Waals forces. For these forces to develop, the paint film must make intimate, molecular contact with the substrate surface. The process of establishing such continuous contact is known as "wetting." For good wetting to occur, the substrate must have a higher surface energy than the liquid paint film. Certain polymer substrate, such as polypropylene, has a low surface energy material and adequate wetting will not be achieved. Typically, these substrates require some sort of surface preparation process to increase the surface energy, such as chemical, flame, and corona treatment. As disclosed herein, printability (or paintability) may be correlated to the surface energy of the blend compositions. Furthermore, printability may be determined by evaluation or observation of samples or by any method that would be known to one of ordinary skill in the art.

Differential Scanning calorimetry (DSC) is used to measure crystallinity in the polymers. About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_c$) is determined from the first cooling curve (peak Tc). With respect to DSC, the temperature at the maximum heat flow rate with respect to a linear baseline is used as the melting point. The linear baseline is constructed from the beginning of the melting (above the glass transition temperature) and to the end of the melting point.

High Temperature Liquid Chromatography: High Temperature Liquid Chromatography Experimental Method Instrumentation is the HTLC experiment, which is done according to the published method with minor modifications (Lee, D.; Miller, M. D.; Meunier, D. M.; Lyons, J. W.; Bonner, J. M.; Pell, R. J.; Shan, C. L. P.; Huang, T. *J. Chromatogr. A* 2011, 1218, 7173). Two Shimadzu (Columbia, Md., USA) LC-20AD pumps are used to deliver decane and trichlorobenzene (TCB) respectively. Each pump is connected to a 10:1 fixed flow splitter (Part #: 620-P020-HS, Analytical Scientific Instruments Inc., Calif., USA). The splitter has a pressure drop of 1500 psi at 0.1 mL/min in $H_2O$ according to the manufacturer. The flow rates of both pumps are set at 0.115 mL/min. After the splitting, the minor flow is 0.01 mL/min for both decane and TCB, determined by weighing the collected solvents for more than 30 min. The volume of the collected eluent is determined by the mass and the densities of the solvents at room temperature. The minor flow is delivered to the HTLC column for separation. The main flow is sent back to the solvent reservoir. A 50-µL mixer (Shimadzu) is connected after the splitters to mix the solvents from Shimadzu pumps. The mixed solvents are then delivered to the injector in the oven of Waters (Milford, Mass., USA) GPCV2000. A Hypercarb™ column (2.1×100 mm, 5 µm particle size) is connected between the injector and a 10-port VICI valve (Houston, Tex., USA). The valve is equipped with two 60-µL sample loops. The valve is used to continuously sample eluent from the first dimension (D1) HTLC column to the second dimension (D2) SEC column. The pump of Waters GPCV2000 and a PLgel Rapid™-M column (10×100 mm, 5 µm particle size) are connected to the VICI valve for D2 size exclusion chromatography (SEC). The symmetric configuration is used for the connections as described in the literature (Brun, Y.; Foster, P. *J. Sep. Sci.* 2010, 33, 3501). A dual-angle light scattering detector (PD2040, Agilent, Santa Clara, Calif., USA) and an IRS inferred absorbance detector are connected after the SEC column for measurement of concentration, composition, and molecular weight.

Separation for HTLC: Approximately 30 mg are dissolved in 8-mL decane by gently shaking the vial at 160° C. for 2 hours. The decane contains 400 ppm BHT(2,6-Di-tert-butyl-4-methylphenol) as the radical scavenger. The sample vial is then transferred to the autosampler of GPCV2000 for injection. The temperatures of the autosampler, the injector, both the Hypercarb and the PLgel columns, the 10-port VICI valve, and both the LS and IRS detectors are maintained at 140° C. throughout the separation.

The initial conditions before injection are as follows. The flow rate for the HTLC column is 0.01 mL/min. The solvent composition in the D1 Hypercarb column is 100% decane. The flow rate for the SEC column is 2.51 mL/min at room temperature. The solvent composition in the D2 PLgel column is 100% TCB. The solvent composition in the D2 SEC column does not change throughout the separation.

A 311-µL aliquot of sample solution is injected into the HTLC column. The injection triggers the gradient described below:

From 0-10 min, 100% decane/0% TCB;

From 10-651 min, TCB is increased linearly from 0% TCB to 80% TCB. The injection also triggers the collection of the light scattering signal at 15° angle (LS15) and the "measure" and "methyl" signals from IRS detector ($IR_{measure}$ and $IR_{methyl}$) using EZChrom™ chromatography data system (Agilent). The analog signals from detectors are converted to digital signals through a SS420X analog-to-digital converter. The collection frequency is 10 Hz. The injection also triggers the switch of the 10-port VICI valve. The switch of the valve is controlled by the relay signals from the SS420X converter. The valve is switched every 3 min. The chromatograms are collected from 0 to 651 min Each chromatogram consist of 651/3=217 SEC chromatograms.

After the gradient separation, 0.2 mL of TCB and 0.3 mL of decane are used to clean and re-equilibrate the HTLC column for next separation. The flow rate of this step is 0.2 mL/min, delivered by a Shimadzu LC-20 AB pump connected to the mixer.

Data Analysis for HTLC: The 651 min raw chromatogram is first unfolded to give 217 SEC chromatograms. Each chromatogram is from 0 to 7.53 mL in the unit of 2D elution volume. The integration limit is then set and the SEC chromatograms undergo spike removal, baseline correction, and smoothing. The process is similar to batch analysis of multiple SEC chromatograms in conventional SEC. The sum of all the SEC chromatograms is inspected to ensure both left side (upper integration limit) and right side (lower integration limit) of the peak were at the baseline as zero. Otherwise, the integration limit is adjusted to repeat the process.

Each SEC chromatogram n from 1 to 217 yields an X-Y pair in the HTLC chromatogram, where n is the fraction number:

$$X_n = \text{elution volume (mL)} = D1 \text{ flow rate} \times n \times t_{switch}$$

where $t_{switch} = 3$ min is the switch time of the 10-port VICI valve.

$$Y_n = \text{signal intensity (Voltage)} = \sum_{peak\ start}^{peak\ end} IR_{measure,n}$$

The above equation uses $IR_{measure}$ signal as the example. The obtained HTLC chromatogram shows the concentrations of the separated polymeric components as a function of elution volume. The normalized $IR_{measure}$ HTLC chromatogram is shown in FIG. 9 with Y represented by dW/dV, meaning the normalized weight fractions with respect to the elution volume.

X-Y pairs of data are also obtained from $IR_{methyl}$ and LS15 signals. The ratio of $IR_{methyl}/IR_{measure}$ is used to calculate composition after calibration. The ratio of $LS15/M_{measure}$ is used to calculate weight-average molecular weight ($M_w$) after calibration.

Calibration follows the procedures of Lee et al., ibid. High density polyethylene (HDPE), isotactic polypropylene (iPP), and ethylene-propylene copolymer with propylene contents of 20.0, 28.0, 50.0, 86.6, 92.0, and 95.8 wt % P are used as the standards for $IR_{methyl}/IR_{measure}$ calibration. The composition of the standards are determined by NMR. The standards are run by SEC with IR5 detector. The obtained $IR_{methyl}/IR_{measure}$ ratios of the standards are plotted as a function of their compositions, yielding the calibration curve.

The HDPE reference is used for routine LS15 calibration. The $M_w$ of the reference is predetermined by GPC as 104.2 kg/mol with LS and RI (refractive index) detectors. GPC uses NBS 1475 as the standard in GPC. The standard has a certified value of 52.0 kg/mol by NIST. Between 7 to 10 mg of the standard is dissolved in 8-mL decane at 160° C. The solution is injected to the HTLC column in 100% TCB. The polymer is eluted under constant 100% TCB at 0.01 mL/min. Therefore, the peak of the polymer appears at the HTLC column void volume. A calibration constant, $\Omega$, is determined from the total LS15 signals ($A_{LS15}$) and the total $IR_{measure}$ signals ($A_{IR,measure}$):

$$\Omega = \frac{A_{LS15}}{A_{IR,measure} M_w}$$

The experimental $LS15/IR_{measure}$ ratio is then converted to $M_w$ through $\Omega$.

By way of example, three HTLC chromatograms are shown in FIG. 11. The black chromatogram is for Comparative BCN1 (i.e., CBCN1). The red chromatogram is for the blend of iPP and TAFMER™ P-0280 (an ethylene/alpha-olefin copolymer product available from Mitsui Chemicals). The blue chromatogram is for the blend of VERSIFY™ 2400 (a propylene-ethylene copolymer available from The Dow Chemical Company) and TAFMER™ P-0280. The dashed line is a linear regression fit of the chemical compositions of iPP, VERSIFY™ 2400, and TAFMER™ P-0280 versus their peak elution volumes. Note that VERSIFY™ 2400 has two peaks. The composition and elution volume of the main peak is used for the linear fit. The three polymers all have $M_w$ above 80,000 Daltons.

$C^{13}$ Nuclear Magnetic Resonance (NMR) Involves the Following:

Sample Preparation: samples are prepared by adding approximately 2.7 g of a 50/50 mixture of tetrachloroethane-d2/orthodichlorobenzene that is 0.025M in chromium acetylacetonate (relaxation agent) to 0.21 g sample in a 10 mm NMR tube. The samples are dissolved and homogenized by heating the tube and its contents to 150° C.

Data Acquisition Parameters: data is collected using a Bruker 400 MHz spectrometer equipped with a Bruker Dual DUL high-temperature CryoProbe. The data is acquired using 320 transients per data file, a 7.3 sec pulse repetition delay (6 sec delay+1.3 sec acq. time), 90 degree flip angles, and inverse gated decoupling with a sample temperature of 125° C. All measurements are made on non-spinning samples in locked mode. Samples are homogenized immediately prior to insertion into the heated (130° C.) NMR Sample changer, and are allowed to thermally equilibrate in the probe for 15 minutes prior to data acquisition. The NMR may be used to determine total weight percent of ethylene, e.g., with respect to the crystalline block composite index discussed below.

Molecular Weight Distribution (MWD) is measured via Gel Permeation Chromatography (GPC). A GPC system consists of either a Polymer Laboratories Model PL-210 or a Polymer Laboratories Model PL-220 instrument. The column and carousel compartments are operated at 140° C. Three Polymer Laboratories 10-micron Mixed-B columns are used. The solvent is 1,2,4 trichlorobenzene. The samples are prepared at a concentration of 0.1 grams of polymer in 50 milliliters of solvent containing 200 ppm of butylated hydroxytoluene (BHT). Samples are prepared by agitating lightly for 2 hours at 160° C. The injection volume used is 100 microliters and the flow rate is 1.0 ml/minute.

Calibration of the GPC column set is performed with 21 narrow molecular weight distribution polystyrene standards with molecular weights ranging from 580 to 8,400,000, arranged in 6 "cocktail" mixtures with at least a decade of separation between individual molecular weights. The standards are purchased from Polymer Laboratories (Shropshire, UK). The polystyrene standards are prepared at 0.025 grams in 50 milliliters of solvent for molecular weights equal to or greater than 1,000,000, and 0.05 grams in 50 milliliters of solvent for molecular weights less than 1,000,000. The polystyrene standards are dissolved at 80° C. with gentle agitation for 30 minutes. The narrow standards mixtures are run first and in order of decreasing highest molecular weight component to minimize degradation. The polystyrene standard peak molecular weights are converted to polyethylene molecular weights using the following equation (as described in Williams and Ward, J. Polym. Sci., Polym. Let., 6, 621 (1968)): $M_{polypropylene} = 0.645(M_{polystyrene})$.

Polypropylene equivalent molecular weight calculations are performed using Viscotek TriSEC software Version 3.0.

Crystalline Block Composite Preparation

An exemplary crystalline block composite sample, Crystalline Block Composite 1 (CBC1), was prepared for the examples of the present disclosure. CBC1 is produced in accordance with the process steps described above using a catalyst fed simultaneously into two reactors.

CBC1 includes (i) an ethylene-propylene polymer, (ii) an isotactic propylene polymer, and (iii) a block copolymer including an ethylene-propylene block that has a same composition as the ethylene-propylene polymer and an isotactic polypropylene hard block that has the same composition as the isotactic propylene polymer. With respect to each of the block copolymers, the ethylene-propylene block is produced in the first reactor and the isotactic polypropylene block is produced in the second reactor. The split between the ethylene-propylene block and the isotactic propylene block in the block copolymer of CBC1 is approximately 50/50.

In accordance with the process steps described above, CBC1 is prepared using two continuous stirred tank reactors (CSTR) connected in series and using a catalyst fed simultaneously into both reactors. The first reactor is approximately 12 gallons in volume while the second reactor is approximately 26 gallons. Each reactor is hydraulically full and set to operate at steady state conditions. Monomers, Solvent, Catalyst, Cocatalyst-1, Cocatalyst-2, and CSA 1 (chain shuttling agent) are flowed to the first reactor according to the process conditions outlined in Table 1. Then, the first reactor contents, as described in Table 1, below, are flowed to a second reactor in series. Additional Catalyst, Cocatalyst-1, and Cocatalyst-2 are added to the second reactor. Two port injectors are used to fee the Catalyst, Cocatalyst-1, Cocatalyst-2, and CSA 1 separately into the reactors.

The Catalyst is ([[rel-2′,2′′′-[(1R,2R)-1,2-cylcohexanediylbis(methyleneoxy-κO)]bis[3-(9H-carbazol-9-yl)-5-methyl[1,1′-biphenyl]-2-olato-κO]](2-)]dimethyl-hafnium).

The Cocatalyst-1 is a mixture of methyldi($C_{14-18}$ alkyl) ammonium salts of tetrakis(pentafluorophenyl)borate, prepared by reaction of a long chain trialkylamine (Armeen™ M2HT, available from Akzo-Nobel, Inc.), HCl and Li[B($C_6F_5$)$_4$], substantially as disclosed in U.S. Pat. No. 5,919,9883, Ex. 2., which are purchased from Boulder Scientific and used without further purification.

CSA-1 (diethylzinc or DEZ) and Cocatalyst-2 (modified methylalumoxane (MMAO)) are purchased from Akzo Nobel and used without further purification.

The Solvent is a hydrocarbon mixture (ISOPAR®E) obtainable from ExxonMobil Chemical Company and purified through beds of 13-X molecular sieves prior to use.

The process conditions for preparing CBC1 is shown below in Table 1.

TABLE 1

| Material Reactor | CBC1 | |
|---|---|---|
| | 1st Reactor | 2nd Reactor |
| Reactor Control Temp. (° C.) | 153 | 130 |
| Solvent Feed (lb/hr) | 343 | 101 |
| Propylene Feed (lb/hr) | 3.4 | 44.1 |
| Ethylene Feed (lb/hr) | 41.7 | 0 |
| Hydrogen Feed SCCM | 0 | 0 |
| Reactor Propylene Conc. (g/L) | 0 | 2.42 |
| Catalyst Efficiency (gPoly/gM) *1.0E6 | 0.247 | 0.138 |
| Catalyst Flow (lb/hr) | 0.31 | 0.53 |
| Catalyst Conc. (ppm) | 600 | 600 |
| Cocatalyst-1 Flow (lb/hr) | 0.62 | 0.53 |
| Cocatalyst-1 Conc. (ppm) | 2729 | 7082 |

TABLE 1-continued

| Material Reactor | CBC1 | |
|---|---|---|
| | 1st Reactor | 2nd Reactor |
| Cocat.-2 Flow (lb/hr) | 0.72 | 0.73 |
| Cocat.-2 Conc. (ppm) | 3442 | 1893 |
| DEZ Flow (lb/hr) | 1.49 | 0 |
| DEZ Conc. (ppm) | 30000 | 0 |

The resultant CBC1 is an ethylene-propylene/isotactic polypropylene (E-P/iPP) based block composite that includes 50 wt % of ethylene-propylene (having an ethylene content of 90 wt %) and 50 wt % of isotactic polypropylene (having an ethylene content of 1 wt %).

The measured properties of CBC1 are provided below in Table 2.

TABLE 2

| Material | MFR (230° C./ 2.16 kg) | Density (g/cc) | wt % PP from HTLC Separation | Mw Kg/mol | Mw/Mn | Total wt % $C_2$ (NMR) | Tm (° C.) Peak 1 (Peak 2) | Tc (° C.) | Melt Enthalpy (J/g) | Crystalline Block Composite Index |
|---|---|---|---|---|---|---|---|---|---|---|
| CBC1 | 10.1 | 0.906 | 20.3 | 92 | 3.50 | 48.1 | 105 (130) | 90.4 | 103 | 0.566 |

Crystalline Block Composite Characterization

Crystalline Block Composite Index (CBCI) provides an estimate of the quantity of block copolymer within the block composite under the assumption that the ratio of CEB to CAOB within the diblock is the same as the ratio of ethylene to alpha-olefin in the overall block composite. This assumption is valid for these statistical olefin block copolymers based on the understanding of the individual catalyst kinetics and the polymerization mechanism for the formation of the diblocks via chain shuttling catalysis as described in the specification. This CBCI analysis shows that the amount of isolated PP is less than if the polymer was a simple blend of a propylene homopolymer (in this example the CAOP) and polyethylene (in this example the CEP). Consequently, the polyethylene fraction contains an appreciable amount of propylene that would not otherwise be present if the polymer was simply a blend of polypropylene and polyethylene. To account for this "extra propylene", a mass balance calculation can be performed to estimate the CBCI from the amount of the polypropylene and polyethylene fractions and the weight % propylene present in each of the fractions that are separated by HTLC. The corresponding CBCI calculations for CBC1 are provided below in Table 3.

TABLE 3

| Line # | Variable | Source | CBCI |
|---|---|---|---|
| 1 | Overall wt % C3 Total | Measured | 51.900 |
| 2 | wt % C3 in PP block/polymer | Measured | 99.000 |
| 3 | wt % C3 in PE block/polymer | Measured | 10.500 |
| 4 | wt fraction PP (in block or polymer) | Eq. 2 below | 0.468 |
| 5 | wt fraction PE (in block or polymer) | 1-Line 4 | 0.532 |
| | Analysis of HTLC Separation | | |
| 6 | wt fraction isolated PP | Measured | 0.203 |
| 7 | wt fraction PE fraction | Measured | 0.797 |
| 8 | wt % C3 in PE-fraction | Eq. 4 below | 39.903 |
| 9 | wt fraction PP-diblock in PE fraction | Eq. 6 below | 0.332 |
| 10 | wt fraction PE in PE fraction | 1-Line 10 | 0.668 |
| 11 | wt fraction Diblock in PE fraction | 10/Line 4 | 0.710 |

TABLE 3-continued

| Line # | Variable | Source | CBCI |
|---|---|---|---|
| 12 | Crystalline Block Composite Index (CBCI) | Eq. 7 below | 0.566 |

Referring to Table 3, above, crystalline block composite index (CBCI) is measured by first determining a summation of the weight % propylene from each component in the polymer according to equation 1, below, which results in the overall weight % propylene/C3 (of the whole polymer). This mass balance equation can be used to quantify the amount of the PP and PE present in the diblock copolymer. This mass balance equation can also be used to quantify the amount of PP and PE in a binary blend or extended to a ternary, or n-component blend. For the CBCs, the overall amount of PP or PE is contained within the blocks present in the diblock and the unbound PP and PE polymers.

$$Wt\ \%\ C3_{Overall} = w_{PP}(wt\ \%\ C3_{PP}) + w_{PE}(wt\ \%\ C3_{PE}) \quad \text{Eq. 1}$$

where
$w_{PP}$=weight fraction of PP in the polymer
$w_{PE}$=weight fraction of PE in the polymer
wt % $C3_{PP}$=weight percent of propylene in PP component or block
wt % $C3_{PE}$=weight percent of propylene in PE component or block Note that the overall weight % of propylene (C3) is measured from C13 NMR or some other composition measurement that represents the total amount of C3 present in the whole polymer. The weight % propylene in the PP block (wt % $C3_{pp}$) is set to 100 or if otherwise known from its DSC melting point, NMR measurement, or other composition estimate, that value can be put into its place. Similarly, the weight % propylene in the PE block (wt % $C3_{PE}$) is set to 100 or if otherwise known from its DSC melting point, NMR measurement, or other composition estimate, that value can be put into its place.

Calculating the Ratio of PP to PE in the Crystalline Block Composite:

Based on Equation 1, the overall weight fraction of PP present in the polymer can be calculated using Equation 2 from the mass balance of the total C3 measured in the polymer. Alternatively, it could also be estimated from a mass balance of the monomer and comonomer consumption during the polymerization. Overall, this represents the amount of PP and PE present in the polymer regardless of whether it is present in the unbound components or in the diblock copolymer. For a conventional blend, the weight fraction of PP and weight fraction of PE corresponds to the individual amount of PP and PE polymer present. For the crystalline block composite, it is assumed that the ratio of the weight fraction of PP to PE also corresponds to the average block ratio between PP and PE present in this statistical block copolymer.

$$w_{PP} = \frac{wt\ \%\ C3_{Overall} - wt\ \%\ C3_{PE}}{wt\ \%\ C3_{PP} - wt\ \%\ C3_{PE}} \quad \text{Eq. 2}$$

where
$w_{PP}$=weight fraction of PP present in the whole polymer
wt % $C3_{PP}$=weight percent of propylene in PP component or block
wt % $C3_{PE}$=weight percent of propylene in PE component or block To estimate the amount of the Diblock in the Crystalline Block Composite, apply equations 3 through 5, and the amount of the isolated PP that is measured by HTLC analysis is used to determine the amount of polypropylene present in the diblock copolymer. The amount isolated or separated first in the HTLC analysis represents the 'unbound PP' and its composition is representative of the PP hard block present in the diblock copolymer. By substituting the overall weight % C3 of the whole polymer in the left hand side of equation 3, and the weight fraction of PP (isolated from HTLC) and the weight fraction of PE (separated by HTLC) into the right hand side of equation 3, the weight % of C3 in the PE fraction can be calculated using equations 4 and 5. The PE fraction is described as the fraction separated from the unbound PP and contains the diblock and unbound PE. The composition of the isolated PP is assumed to be the same as the weight % propylene in the iPP block as described previously.

$$wt\ \%\ C3_{Overall} = w_{PPisolated}(wt\ \%\ C3_{PP}) + w_{PE\text{-}fraction}(wt\ \%\ C3_{PE\text{-}fraction}) \quad \text{Eq. 3}$$

$$wt\ \%\ C3_{PE\text{-}fraction} = \frac{wt\ \%\ C3_{Overall} - w_{PPisolated}(wt\ \%\ C3_{PP})}{w_{PE\text{-}fraction}} \quad \text{Eq. 4}$$

$$w_{PE\text{-}fraction} = 1 - w_{PPisolated} \quad \text{Eq. 5}$$

where
$w_{PPisolated}$=weight fraction of isolated PP from HTLC
$w_{PE\text{-}fraction}$=weight fraction of PE separated from HTLC, containing the diblock and unbound PE
wt % $C3_{PP}$=weight % of propylene in the PP; which is also the same amount of propylene present in the PP block and in the unbound PP
wt % $C3_{PE\text{-}fraction}$=weight % of propylene in the PE-fraction that was separated by HTLC
wt % $C3_{overall}$=overall weight % propylene in the whole polymer The amount of wt % C3 in the polyethylene fraction from HTLC represents the amount of propylene present in the block copolymer fraction that is above the amount present in the 'unbound polyethylene'. To account for the 'additional' propylene present in the polyethylene fraction, the only way to have PP present in this fraction is for the PP polymer chain to be connected to a PE polymer chain (or else it would have been isolated with the PP fraction separated by HTLC). Thus, the PP block remains adsorbed with the PE block until the PE fraction is separated.

The amount of PP present in the diblock is calculated using Equation 6.

$$w_{PP\text{-}diblock} = \frac{wt\ \%\ C3_{PE\text{-}fraction} - wt\ \%\ C3_{PE}}{wt\ \%\ C3_{PP} - wt\ \%\ C3_{PE}} \quad \text{Eq. 6}$$

Where
wt % $C3_{PE\text{-}fraction}$=weight % of propylene in the PE-fraction that was separated by HTLC (Equation 4)
wt % $C3_{pp}$=weight % of propylene in the PP component or block (defined previously)
wt % $C3_{pp}$=weight % of propylene in the PE component or block (defined previously)

$w_{PP\text{-}diblock}$=weight fraction of PP in the diblock separated with PE-fraction by HTLC The amount of the diblock present in this PE fraction can be estimated by assuming that the ratio of the PP block to PE block is the same as the overall ratio of PP to PE present in the whole polymer. For example, if the overall ratio of PP to PE is 1:1 in the whole polymer, then it assumed that the ratio of PP to PE in the diblock is also 1:1. Thus the weight fraction of diblock present in the PE fraction would be weight fraction of PP in the diblock ($w_{PP\text{-}diblock}$) multiplied by two. Another way to calculate this is by dividing the weight fraction of PP in the diblock ($w_{PP\text{-}diblock}$) by the weight fraction of PP in the whole polymer (equation 2).

To further estimate the amount of diblock present in the whole polymer, the estimated amount of diblock in the PE fraction is multiplied by the weight fraction of the PE fraction measured from HTLC. To estimate the crystalline block composite index, the amount of diblock copolymer is determined by equation 7. To estimate the CBCI, the weight fraction of diblock in the PE fraction calculated using equation 6 is divided by the overall weight fraction of PP (as calculated in equation 2) and then multiplied by the weight fraction of the PE fraction. The value of the CBCI can range from 0 to 1, wherein 1 would be equal to 100% diblock and zero would be for a material such as a traditional blend or random copolymer.

$$CBCI = \frac{w_{PP\text{-}diblock}}{w_{PP}} \cdot w_{PE\text{-}fraction} \quad \text{Eq. 7}$$

Where $w_{PP\text{-}diblock}$=weight fraction of PP in the diblock separated with the PE-fraction by HTLC (Equation 6)

$w_{PP}$=weight fraction of PP in the polymer $w_{PE\text{-}fraction}$=weight fraction of PE separated from HTLC, containing the diblock and unbound PE (Equation 5)

wt % of iPP block (with 1 wt % of ethylene, based on the total weight of the iPP block), and a melt flow rate of 10.1 g/10 min at 230° C./2.16 kg.

Ionomer: A polymeric ethylene ionomer having a density of 0.954 g/cc (according to ASTM D792) and a melt index of 2.8 g/10 min (according to ASTM D1238 at 190° C./2.16 kg) (available as AMPLIFY™ IO 3802 from The Dow Chemical Company).

RCP: A polypropylene random copolymer having a density of 0.900 g/cc (according to ASTM D792) and a melt flow rate of 1.9 g/10 min (according to ASTM D1238 at 230° C./2.16 kg) (available as RCP 6D83K from Braskam Company).

Crystalline Block Composite A (CBCA): A crystalline block composite prepared similar to as discussed above that includes a block copolymer having 70 wt % of EP block (with 65 wt % of ethylene, based on the total weight of the EP block) and 30 wt % of iPP block (with 3 wt % of ethylene, based on the total weight of the iPP block) and a melt flow rate of 5.2 g/10 min at 230° C./2.16 kg. The CBCA further includes a density of 0.872 g/cc (according to ASTM D792), a Mw of 101 Kg/mol, a MWD of 2.45, a total C2 (wt %) of 47.2%, a second peak Tm of 119° C., a Tc of 67° C., a melt enthalpy of 35 J/g, and a Block Composite Index (as discussed in, e.g., U.S. Pat. No. 8,686,087) of 0.174.

All blends were compounded via a Haake Rheomix 3000 rotating at 50 rpm. The raw materials are dry mixed before adding to the mixer. The mixer is preheated to 190° C. and the mixing is kept for 5 minutes after the ram is secured down. The formulations of the sample blend compositions are shown below in Table 4. The blends were taken out of the mixer and compression molded into 5 mm thick plaques. The plaques used for microtensile tests were prepared by compression molding using a Tetrahedron press. The polymers were pre-melted at 190° C. for 1 minute at 5 klb and then pressed for 5 minutes at 30 klb and then cooled between cold plates at 17° C. for 1 minute.

In particular, Working Example 1 and Comparative Examples A to D are prepared according to the formulations below in Table 4.

TABLE 4

| Materials | | Ex. A | Ex. B | Ex. C | Ex. D | Ex. 1 |
|---|---|---|---|---|---|---|
| Formulation (wt %) | | | | | | |
| Ionomer | | — | 100 | 50 | 55 | 55 |
| RCP | | 100 | — | 50 | 35 | 35 |
| CBC1 | | — | — | — | — | 10 |
| CBCA | | — | — | — | 10 | — |
| Properties | | | | | | |
| Density | g/cc | 0.9041 | 0.9537 | 0.9322 | 0.9257 | 0.9304 |
| Scratch Resistance (5-Finger) | | 4.5 | 5 | 3 | 3.5 | 3.5 |
| Haze | % | 60 | 43 | 79 | 96 | 73 |
| Tabor Abrasion | Grams | 0.059 | 0.033 | 0.447 | 0.478 | 0.101 |
| Tensile Strength | Psi | 3201 | 3303 | 1462 | 1099 | 2075 |
| Surface Energy Total | mN/m | 27.5 | 29.9 | 33 | 29.1 | 31.6 |
| Polar Component | mN/m | 1.1 | 5.9 | 2.2 | 0.4 | 1.6 |
| Printability | | Poor | Excellent | Good | Poor | Good |

Preparation of the Polyolefin Blend Compositions

The following materials are principally used in the exemplary compositions of the present application:

Crystalline Block Composite 1 (CBC1): The crystalline block composite discussed above that includes a block copolymer having 50 wt % of EP block (with 90 wt % of ethylene, based on the total weight of the EP block) and 50

As seen in Table 4, Comparative Example A demonstrates good mechanical properties, abrasion resistance, scratch/mar resistance, and optical clarity; however, the printability is poor. Comparative Example B demonstrates excellent mechanical properties, abrasion resistance, scratch/mar resistance, optical clarity, and printability; however, this example is not cost effective. Comparative Example 3 shows a lower rating of scratch resistance as well as a lower contact clarity value. Comparative Example 4 shows an improvement in scratch resistance, comparable abrasion resistance but inferior optical and tensile strength. Working Example 1 shows improved scratch resistance, optical properties, abrasion resistance, and tensile strength over an uncompatibilized RCP/Ionomer blend.

What is claimed is:

1. A composition comprising:
   (A) from 10 wt % to 90 wt % of a polymeric ethylene ionomer;
   (B) from 10 wt % to 40 wt % of a propylene component including at least one propylene based polymer having a propylene content of at least 50.0 wt %, based on the total weight of the propylene based polymer, and a melt flow rate from 0.5 g/10 min to 50 g/10 min (according to ASTM D-1238 at 230° C./2.16 kg);
   (C) from 5 wt % to 20 wt % of a crystalline block composite comprising (i) a crystalline ethylene based polymer, (ii) a crystalline alpha-olefin based polymer derived from at least one of a $C_{3-10}$ alpha-olefin, and (iii) a block copolymer comprising a crystalline ethylene block and a crystalline alpha-olefin block, the crystalline ethylene block of the block copolymer having the same composition as the crystalline ethylene based polymer of the crystalline block composite, and the crystalline alpha-olefin block of the block copolymer having the same composition as the crystalline alpha-olefin based polymer of the crystalline block composite,
   wherein the polymeric ethylene ionomer has a density from 0.920 g/cc to 0.960 g/cc (according to ASTM D-792) and a melt index from 0.5 g/10 min to 10 g/10 min (according to ASTM D-1238 at 190° C./2.16 kg).

2. The composition of claim 1, further comprising from 0.1 wt % to 5 wt % of an antioxidant.

3. The composition of claim 1, wherein the polymeric ethylene ionomer comprises an acrylic acid ethylene copolymer that is neutralized with a metal salt.

4. The composition of claim 3, wherein the metal salt is selected from the group consisting of zinc, sodium, and calcium.

5. The composition of claim 1, wherein the propylene based polymer is a random copolymer polypropylene.

6. The composition of claim 1, wherein the propylene based polymer has a density from 0.880 g/cc to 0.920 g/cc (according to ASTM D-792) and a melt flow rate from 0.5 g/10 min to 10 g/10 min (according to ASTM D-1238 at 230° C./2.16 kg).

7. The composition of claim 1, wherein the crystalline block composite has a density from 0.890 g/cc to 0.920 g/cc (according to ASTM D-792) and a melt flow rate from 8 g/10 min to 20 g/10 min (according to ASTM D-1238 at 230° C./2.16 kg).

8. The composition of claim 1, further comprising a scratch resistance of greater than 3.5 (according to ASTM D7027).

9. The composition of claim 1, further comprising a tabor abrasion of less than 0.200 g (according to ASTM D4060).

10. The composition of claim 1, further comprising a total surface energy of greater than 30 mN/m (according to the Owens Wendt Theory).

11. An article manufactured from the composition of claim 1.

* * * * *